US007624304B2

(12) United States Patent
Thiagarajan et al.

(10) Patent No.: US 7,624,304 B2
(45) Date of Patent: Nov. 24, 2009

(54) DEFECT DETECTION FOR INTEGERS

(75) Inventors: Jayaraman Thiagarajan, Bothell, WA (US); Ramanathan Venkatapathy, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 684 days.

(21) Appl. No.: 10/961,635

(22) Filed: Oct. 7, 2004

(65) Prior Publication Data
US 2006/0080578 A1 Apr. 13, 2006

(51) Int. Cl.
G06F 11/00 (2006.01)
G06F 9/44 (2006.01)

(52) U.S. Cl. .......................... 714/25; 717/124; 726/22; 726/25

(58) Field of Classification Search ........................ None
See application file for complete search history.

(56) References Cited

U.S. PATENT DOCUMENTS

| 5,175,856 | A | 12/1992 | Van Dyke et al. | |
|---|---|---|---|---|
| 5,193,180 | A | 3/1993 | Hastings | |
| 5,535,329 | A | 7/1996 | Hastings | |
| 5,581,695 | A | 12/1996 | Knoke et al. | |
| 5,581,696 | A | 12/1996 | Kolawa et al. | |
| 6,292,934 | B1 | 9/2001 | Davidson et al. | |
| 6,314,558 | B1 * | 11/2001 | Angel et al. | 717/118 |
| 6,460,178 | B1 * | 10/2002 | Chan et al. | 717/147 |
| 6,470,493 | B1 | 10/2002 | Smith et al. | |
| 6,662,356 | B1 | 12/2003 | Edwards et al. | |
| 6,802,056 | B1 | 10/2004 | Chaiken et al. | |
| 7,284,274 | B1 * | 10/2007 | Walls et al. | 726/25 |
| 2003/0204836 | A1 | 10/2003 | Srivastava et al. | |
| 2004/0117771 | A1 | 6/2004 | Vankatapathy | |

OTHER PUBLICATIONS

Wagner et al., "A First Step Towards Automated Detection of Buffer Overrun Vulnerabilities", 2000, NDSS, pp. 1-15.*
David A. Wagner, "Static Analysis and Computer Security: New Techniques for Software Assurance", 2000, U. of California at Berkeley, pp. 1-114.*
Shankar et al., "Detecting Format String Vulnerabilities with Type Qualifiers", May 11, 2001, University of Califonia at Berkeley, pp. 1-16.*
Larochelle et al., "Statically Detecting Likely Buffer Overflow Vulnerabilities", Aug. 13, 2001, USENIX, pp. 1-14.*
Belli et al., "Logic Representation of Programs to Detect Arithmetic Anomalies", 2000, pp. 216-223.*
Sarkar et al., "Flow-insensitive Static Analysis for Detecting Integer Anomalies in Programs", Apr. 2006, Microsoft Research, pp. 1-14.*

(Continued)

Primary Examiner—Michael J. Yigdall
Assistant Examiner—Ben C Wang
(74) Attorney, Agent, or Firm—Klarquist Sparkman, LLP

(57) ABSTRACT

Various techniques can be used to detect programming defects relating to the use of integers. A data structure can be created to represent ordering relationships in software instructions. Such ordering relationships can represent common unsound programmer assumptions. After annotating the data structure, unvalidated ordering relationships can be identified. Validation can use both explicit and implicit techniques. Filtering can be used to focus on only significant integer expressions, such as those used in buffer operations. For example, buffer accesses that attempt out-of-bounds buffer accesses due to integer overflow can be detected.

12 Claims, 10 Drawing Sheets

OTHER PUBLICATIONS

Ganapathy et al., "Buffer Overrun Detection using Linear Programming and Static Analysis", CCS'03 Oct. 27, 2003, Washington, DC, USA, ACM, pp. 345-354.*

BoundsChecker, http://www.compuware.com/products/devpartner/bounds/, 2 pages, viewed Nov. 13, 2002.

Bush et al, "A static analyzer for finding dynamic programming errors," *Software: Practice and Experience*, pp. 775-802, 2000.

Dor et al., "Cleanness Checking of String Manipulations in C Programs via Integer Analysis," *Proc. 8th Int'l Static Analysis Symposium*, 19 pages, Jun. 2001.

Dor et al., "CSSV: Towards a Realistic Tool for Statically Detecting All Buffer Overflows in C,"*PLDI'03*, San Diego, California, pp. 155-167, Jun. 9-11, 2003.

Edwards, "Black-Box Testing Using Flowgraphs: An Experimental Assessment of Effectiveness and Automation Potential," *Software Testing, Verification and Reliability*, vol. 10, No. 4, 13 pages, Dec. 2000.

Evans et al., "Improving Security Using Extensible Lightweight Static Analysis," *IEEE Software*, pp. 42-51, Jan./Feb. 2002.

Evans et al., "LCLint: A Tool for Using Specifications to Check Code," *SIGSOFT Symposium on the Foundations of Software Engineering*, 10 pages, Dec. 1994.

Evans et al., "Splint Manual, Version 3.1.1-1," *Secure Programming Group, University of Virginia Department of Computer Science*, 121 pages, Jun. 5, 2003.

U.S. Appl. No. 09/712,063, filed Nov. 14, 2000, Wang et al.

U.S. Appl. No. 10/608,985, filed Jun. 26, 2003, Srivastava et al.

U.S. Appl. No. 10/638,116, filed Aug. 8, 2003, Srivastava et al.

U.S. Appl. No. 10/679,254, filed Oct. 2, 2003, Das et al.

U.S. Appl. No. 10/788,948, filed Feb. 27, 2004, Venkatapathy et al.

Evans, "Static Detection of Dynamic Memory Errors," *SIGPLAN Conf. on Programming Language & Design Implementation*, Philadelphia, 10 pages, May 1996.

Evans, "Using Specifications to Check Source Code," *TR-628, MIT Lab for Computer Science*, 97 pages, Jun. 1994.

Foster et al., "A Theory of Type Qualifiers," *Proc. ACM SIGPLAN '99 Conf. on Programming Language and Design Implementation (PLDI)*, Atlanta, Georgia, 12 pages, May 1999.

Guyer et al., "An Annotation Language for Optimizing Software Libraries," *Proc. Second Conf. on Domain Specific Languages*, Austin, Texas, 14 pages, Oct. 1999.

Horning, "The Larch Shared Language: Some Open Problems," *Compass/ADT Workshop*, Oslo, Norway, 16 pages, Sep. 1995.

Khurshid et al., "An Analyzable Annotation Language," *OOPSLA '02*, Seattle, Washington, 15 pages, Nov. 2002.

Kramer, "Examples of Design by Contract in Java Using Contract, the Design by Contract™ Tool for Java™," *Object World Berlin '99, Design & Components*, 26 pages, May 17-20, 1999.

Larochelle et al., "Statistically Detecting Likely Buffer Overflow Vulnerabilities," *2001 USENIX Security Symposium*, Washington D.C., 5 pages, Aug. 2001.

Leavens et al., "Enhancing the Pre- and Postcondition Technique for More Expressive Specifications," *Proc. World Congress on Formal Methods in the Development of Computing Systems*, Toulouse, France, 21 pages, Sep. 1999.

Leavens et al., "Preliminary Design of JML," *Technical Report 98-06v, Iowa State University Department of Computer Science*, 94 pages, Jun. 1998-2003, revised May 2003.

Leino, "Checking correctness properties of object-oriented programs," *Internet*, http://research.microsoft.com/leino/papers/1, 49 pages, Aug. 19, 2002.

Microsoft Corp., "Scalable Program Analysis," *Internet*, http://research.microsoft.com/spa/, 3 pages, downloaded on Sep. 5, 2003.

Rational® Purify® for Windows, http://www.rational.com/products/purify_nt/index.jsp, 3 pages, viewed Nov. 13, 2002.

Srivastava et al., "Vulcan Binary transformation in a distributed environment" Technical Report, pp. 1-12, Apr. 2001.

Srivastava et al., "Effectively Prioritizing Tests in Development Environment," International Symposium on Software Testing and Analysis, 11 pages, Jul. 2002.

Tech-FAQ "What is an Integer?" screenshots, 3 pages, http://www.tech-faq.com/computers/integer-overflow.html, website visited on Sep. 23, 2004.

Wahls et al., "The Direct Execution of SPECS-C++: A Model-Based Specification Language for C++ Classes," *Technical Report TR94-02b, Iowa State University Department of Computer Science*, 52 pages, Nov. 18, 1994.

Wang et al., BMAT—A Binary Matching Tool for Stale Profile Propagation, Journal of Instruction—Level Parallelism 2, pp. 1-20, Apr. 2000.

* cited by examiner

DEFECT DETECTION FOR INTEGERS

TECHNICAL FIELD

The technical field relates to defect analysis in software and, more particularly, to detecting programming defects which could lead to anomalies such as integer overflows.

BACKGROUND

The objective of software development is to produce robust, high-quality software. To do so, during development, software is extensively tested for defects. When a defect is identified, developers strive to design solutions that fix the defect without introducing new problems into the software. Large scale software projects might contain many defects that need to be identified and fixed before the software is released. Hence, testing and, as a result, debugging software can take a significant amount of software development time. Over the years, two main categories of defect-finding techniques have been developed to aid software programmers find and fix defects: black-box testing and white-box testing.

Black-box testing (BBT), also known as functional testing, is a software testing technique whereby the internal workings of a software program are not known by the tester. In BBT, a tester only knows what the inputs into a software program are and what the expected outcomes should be. The tester generally does not examine the programming code and has no knowledge of the program other than its specification. The tester, without any knowledge of the internal structure of the program, attempts to "break" it by putting the software through a battery of tests. For example, given a certain input, the tester checks to see that the program produces the expected result. The tester also performs other types of testing including, among others, stress testing and recovery testing. When testing generates unexpected results, an error message notifies the tester that an error occurred.

White-box testing (WBT) is a technique for performing static analysis on software source code. Static analysis in this context means testers have explicit access to the internal workings of the software program being tested. Unlike black-box testers, white-box testers use their specific knowledge of programming code to examine outputs. Basically, white-box testers logically step through every line and path in the source code to verify correct output. For example, a software development company might implement a review of code wherein every member of a software development team analyzes the source code for defects. The key advantage is that every line of code is evaluated for defects.

However, certain defects in source code still escape detection. For example, neither BBT nor WBT testing techniques identify every instance of certain defects related to integer processing, such as integer overflows and integer underflows. Thus, there is a need for better defect detection techniques that can detect defects such as possible integer overflows and integer underflows. Such techniques could many advantages, such as more reliable and secure software.

SUMMARY

Technologies are presented herein for finding software defects. In various common situations involving testing, debugging, or otherwise evaluating software, these tools and techniques can provide for detection of software defects such as those related to integer overflows and integer underflows.

Ordering relationships between integer expressions for software being tested can be represented. It can then be determined whether such ordering relationships are validated by the software being tested. Then, one or more unvalidated ordering relationships can be identified. Such unvalidated ordering relationships indicate a potential defect in the program instructions.

Ordering relationships can be represented in a data structure, such as a directed graph. Nodes in the graph can represent the integer expressions. Edges can represent the ordering relationships.

A software development environment can analyze source code to identify potential software defects related to potential integer anomalies in the source code.

Explicit and implicit validation techniques can be supported. Analysis can be limited to certain types of integer processing (e.g., that related to buffers).

The foregoing and other features and advantages will become more apparent from the following detailed description of disclosed embodiments, which proceeds with reference to the accompanying drawings.

DETAILED DESCRIPTION

EXAMPLE 1

Figure 1:
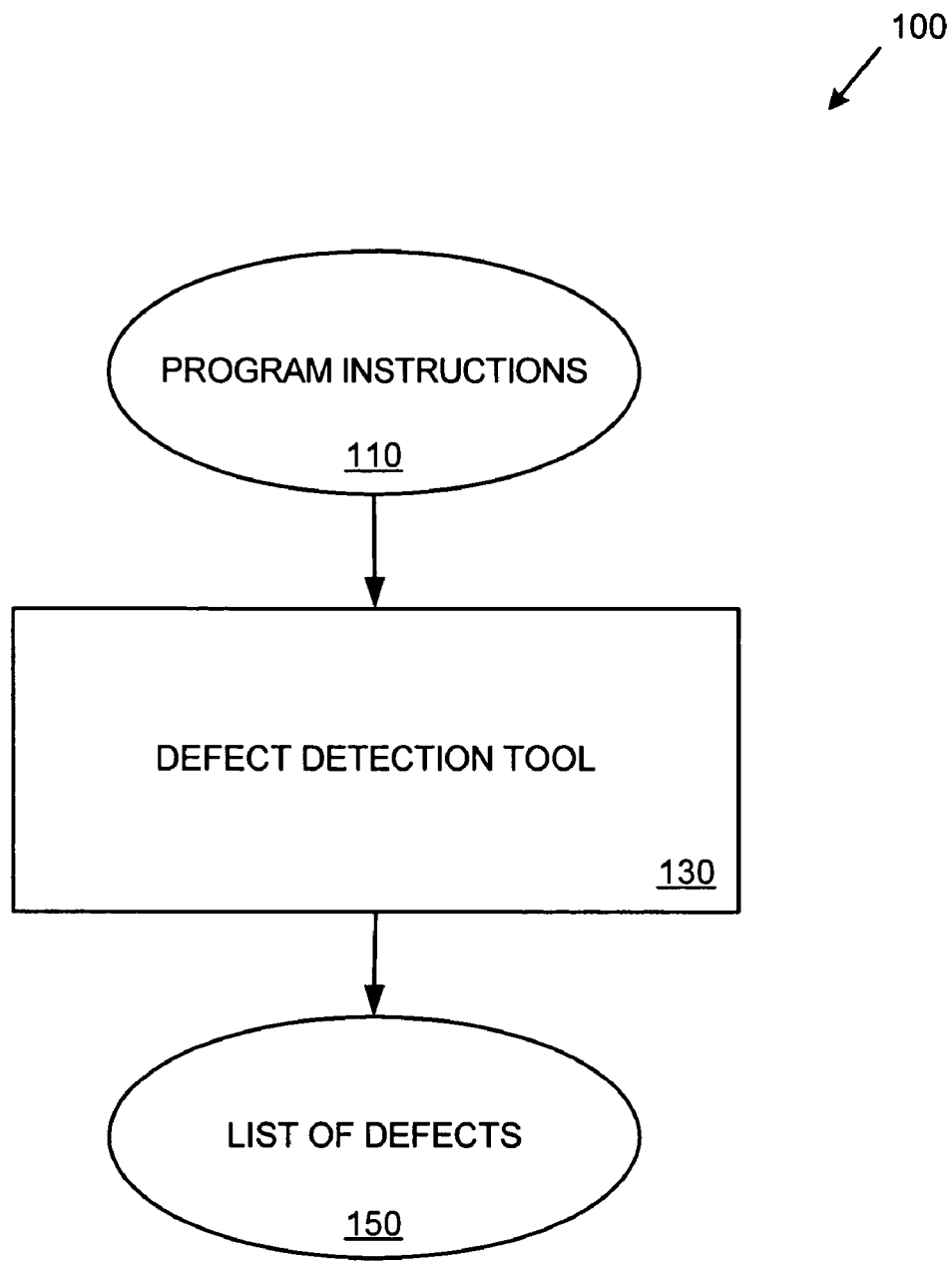
FIG. 1 is a block diagram of an exemplary system using a defect detection tool that identifies defects in program instructions.

Exemplary Detection of Programming Defects in Program Instructions

The following description is directed to technologies for detecting programming defects in program instructions (e.g., source code). In various common situations, these technologies can dramatically improve the efficiency and reliability of static analysis software testing techniques. The technologies presented herein can find programming defects in program instructions.

In various common situations involving testing, debugging, or otherwise evaluating software, these technologies can dramatically improve the ability to identify defects in program instructions. For example, the technologies can provide for detection of programming defects for integers such as integer overflows and integer underflows.

EXAMPLE 2

Exemplary Program Instructions

In any of the examples herein, program instructions can include any representation of software instructions, including source code, object code, any intermediate representations, and the like. Such instructions can be any code segment (e.g., program, function, procedure, or portion thereof).

Specific types of representations of program instructions (e.g., an abstract syntax tree) can also be used. An abstract syntax tree generally refers to a compiler's internal representation of a program based on the syntax or grammar of the programming language.

Although the technologies described herein can be used for programming languages such as Java, C#, C++, and Perl, the technologies can be adapted to work in conjunction with any programming language.

EXAMPLE 3

Exemplary Integers in Programming

In software, integers can be represented digitally via a digital variable. In practice, a limited number of bits are available to represent the integer. For example, a signed integer variable j may be represented by 16 bits. If such is the case, then the integer variable j can represent numbers in a range from −32,768 to 32,767.

Any of a wide variety of integer representations can be used with any of the examples described herein. For example, any number of bits in a signed or unsigned configuration can be used. In practice, such integers can appear in source code as any of the following variable types: int, unsigned, short, long, byte, combinations thereof, and the like. In some implementations, the char type is used to represent integers.

Programming languages such as C, C++, and Java have several integer types that can be used to represent integer values using various numbers of bits.

EXAMPLE 4

Exemplary Anomalies for Integers

When arithmetic operations on integer values yield new values that cannot be represented in the range of the type, a phenomenon called an "integer anomaly" can result. Two possible integer anomalies include integer overflows and integer underflows.

As described above, integers can only represent a range of numbers. Curious and unexpected behavior can result if an attempt is made to represent a value outside the range. For example, consider the case in which 1 is added to a 16-bit signed integer j containing the value 32,767. An overflow will occur, and the resulting value will be interpreted as −32,768. Thus, after adding 1 to a variable, its value has unexpectedly decreased. Such a result is an integer anomaly called an "integer overflow."

Generally, an integer overflow occurs when data resulting from input or processing requires more bits that have been provided in hardware or software to store the data. Generally, an integer underflow occurs when a calculation produces a result too small (e.g., less than −32,768 for the exemplary integer variable j) to be represented by the range of binary digits available for holding that value.

The following code illustrates another example of an integer overflow in which integers are represented in 32 bits:

```
unsigned int i, k;
i = 0xFFFFFFFF;
k = i + 1;
```

The range of values representable by the unsigned int type, and thus variables i and k, is 0 to 0xFFFFFFFF (e.g., 0 to 4,294,967,295). In the second line of the code above, variable i is assigned the maximum value. In the next line, the value assigned to k is the value of i incremented, by 1, to 4,294,967,296. This value can not be represented by the unsigned int type. The result k thus overflows to the bit representation equivalent to zero, meaning that variable k now has the value 0 instead of 4,294,967,296.

Although such behavior relating to integer anomalies is usually deterministic (i.e., it is consistent), it can cause problems if not accounted for by the programmer.

EXAMPLE 5

Exemplary Programming Defects Related to Integer Anomalies

Certain skilled programmers are aware of the phenomenon of integer anomalies, and know to account for it in their programming. However, the situations leading to the phenomenon are commonplace and easy to overlook during code reviews. Further some programmers simply do not know to look for them. Finally, given a piece of software, it is often not known exactly who worked on the software or whether it was ever checked for potential integer anomalies.

Software that fails to account for potential integer anomalies is said to contain a defect (e.g., a bug). Unfortunately, finding defects related to potential integer anomalies can be very difficult. For example, a tester might not ever detect the defect unless the tester is fortunate enough to craft the exact input or behavior that results in the anomaly. Further, automated program analysis often assumes the absence of integer anomalies to streamline processing. If so, they also will not detect defects related to possible integer anomalies. In any of the examples described herein, a defect can be a defect related to potential integer anomalies (e.g., a potential integer overflow or a potential integer underflow)

EXAMPLE 6

Exemplary Results of Programming Defects Related to Integer Anomalies

In some cases, a defect related to potential integer anomaly is not significant. However, in some cases it can be significant and may even pose a security threat.

For example, a common use of integers is to perform processing on a buffer. A buffer typically has a limited size (e.g., a bounded range of memory locations). Processing performed on the buffer should not attempt to access locations outside (e.g., before the beginning of or after the end of) the buffer bounds. A programmer can perform bounds checks (e.g., range checks) on related integers to verify that such an access will not occur.

However, if the programmer overlooks the phenomenon of integer anomalies, it is possible that the resulting code will unexpectedly allow an access outside of the buffer. Such accesses can result in security problems.

For example, allowing software to read data outside the buffer may result in access to arbitrary, unauthorized data (e.g., passwords, secure data, and the like). Allowing software to write data outside the buffer may result unauthorized modifications of data or unauthorized execution of code.

A malicious user may become aware of such a defect and exploit it as a security weakness. Thus, software defects related to integer anomalies as used in buffers are particularly important to detect and can be considered significant defects.

EXAMPLE 7

Exemplary Defect Detection Tool

FIG. 1 shows an exemplary system 100 using a defect detection tool 130 in which the techniques described herein may be implemented. The defect detection tool 130 can include elements of only software, only hardware, or both. The defect detection tool 130 works with input program instructions 110. The defect detection tool 130 produces a list of defects 150 that are found in the program instructions 110. The list of defects 150 may include defects such as potential integer overflows and potential integer underflows.

The list of defects 150 may be in a variety of formats. For example, it may be a description document such as an XML document, an HTML document, or a text file. The list of defects 150 can be output to a display such as a computer monitor or a printer. The list of defects 150 can be used by a developer to identify and fix defects.

EXAMPLE 8

Exemplary Method for Identifying Defects in Source Code

Figure 2:
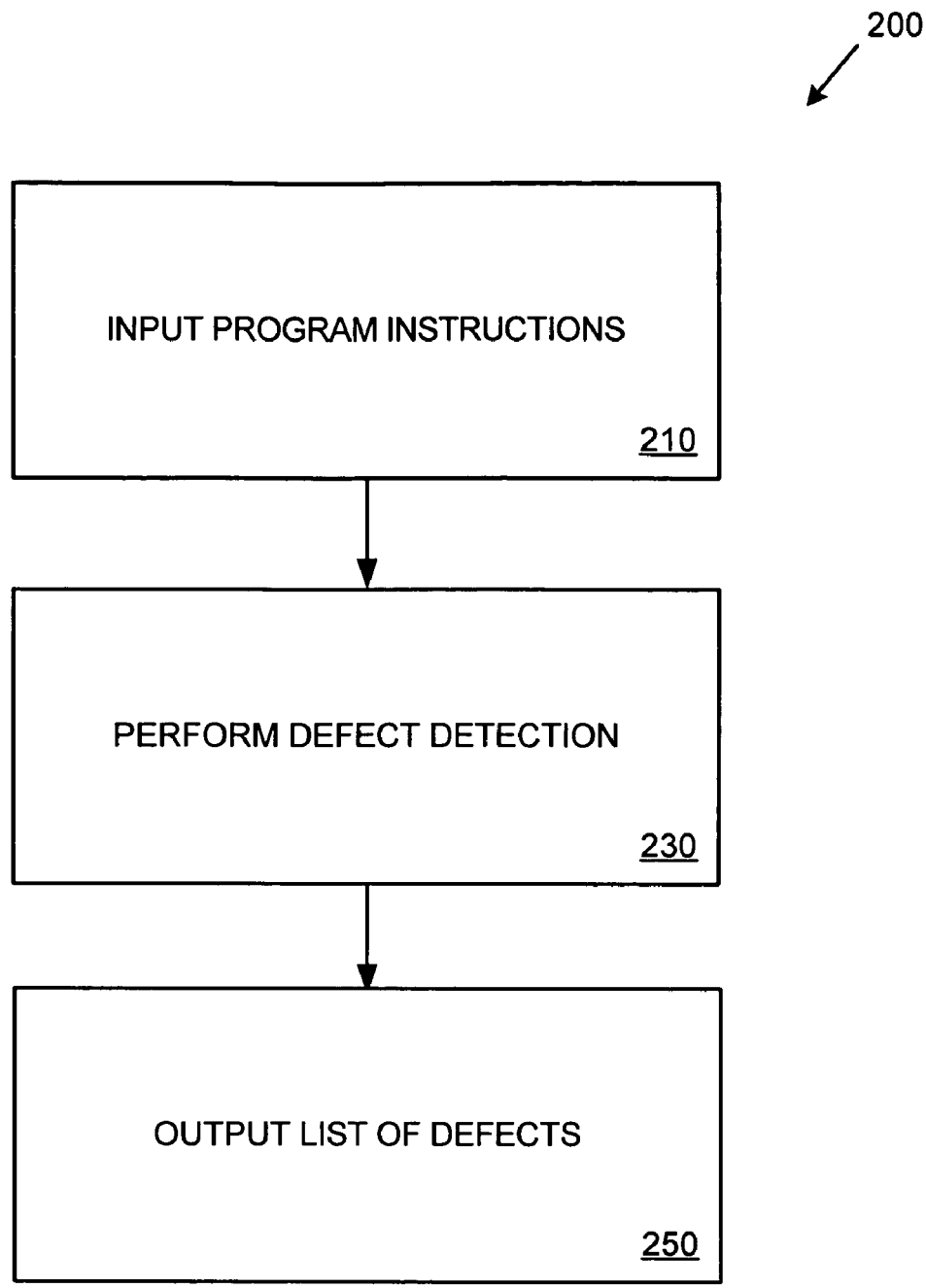
FIG. 2 is a flowchart illustrating an exemplary method for identifying defects in program instructions.

FIG. 2 is a flowchart illustrating an exemplary method 200 for identifying defects in program instructions.

At 210, program instructions are provided as input to a defect detection tool, such as the defect detection tool 130 of FIG. 1.

At 230, the defect detection tool performs an instruction-level analysis of the program instructions to determine if there are programming defects in the program instructions. In any of the examples herein, the analysis can be intraprocedural (e.g., each function or procedure in the source code is analyzed independently of each other). Also, in any of the examples herein, the analysis can be flow-insensitive (e.g., the analysis is not affected by control flow transitions such as branches, loops, and exceptions). Further, in any of the examples herein, the analysis can be context-insensitive (e.g., the calling context for a function or procedure is ignored).

At 250, a report is provided as output that details what, if any, programming defects were discovered in the program instructions. For example, the report can indicate how many potential integer anomalies (e.g., overflows or underflows) were detected, and where they are located in the program instructions.

EXAMPLE 9

Another Exemplary Method for Identifying Defects in Program Instructions

Figure 3:
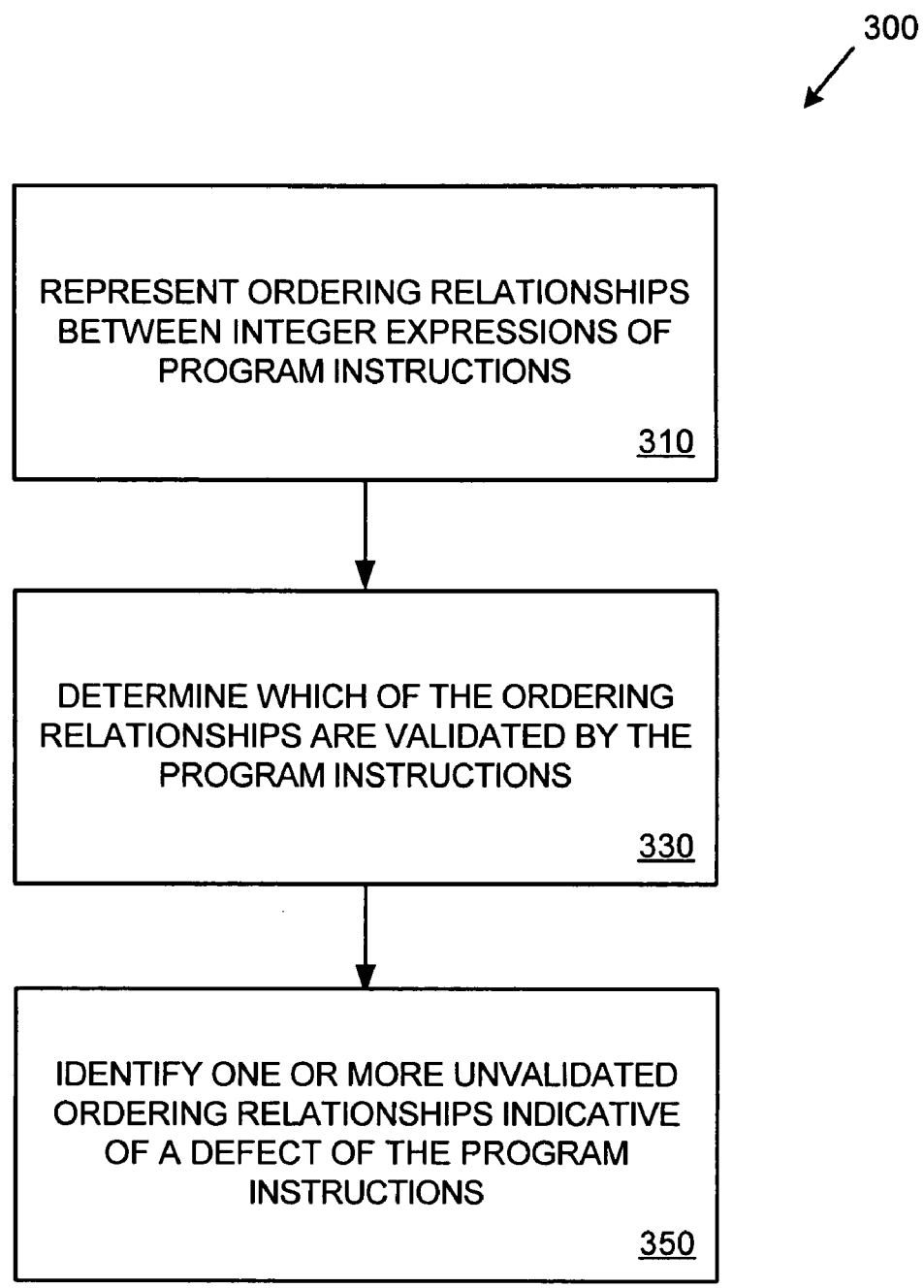
FIG. 3 is a flowchart illustrating another exemplary method for identifying defects in program instructions.

FIG. 3 is a flowchart illustrating another exemplary method 300 for identifying defects in program instructions.

At 310, ordering relationships between integer expressions of program instructions are represented. The ordering relationships can be represented in a variety of ways, such as by using a graph. Nodes in the graph can represent integer expressions, and edges can represent ordering relationships between the expressions.

At 330, it is determined which of the ordering relationships are validated by the program instructions. As described herein, both explicit and implicit validation can be supported.

At 350, one or more unvalidated ordering relationships indicative of a defect (e.g., a potential integer anomaly) of the program instructions are identified. In the case of a graph representation, the graph can be walked to find unvalidated ordering relationships.

EXAMPLE 10

Exemplary Filtering

In any of the examples described herein, analysis of integer expressions can be limited to those considered to be significant based on one or more criteria. For example, a possible criterion is that the integer expression is related to buffer processing. Other integer expressions can be ignored when identifying defects (e.g., unvalidated assumptions). In this way, a large volume of program instructions can be processed without resulting in a large list of insignificant defects.

For example, a data structure can be annotated to indicate which of the integer expressions are used in buffer processing (e.g., buffer allocation, array accesses, pointer derefs, and buffer size arguments such as those used in the memcpy or similar instructions). Identification of defects can be limited to integer expressions that are so used or related to (e.g., connected in a graph to) expressions so used.

Another type of use that can be considered significant is a range check. A data structure can be annotated to indicate which of the integer expressions are used in range checks. Such annotation can be performed in addition to annotation for buffer processing.

The data structure can be annotated to indicate use types other than buffer uses or range checks. Such use types can be used for filtering.

EXAMPLE 11

Exemplary Ordering Relationships

An ordering relationship between a set of integer expressions can include greater than, less than, less than or equal to, greater than or equal to, equal to, and the like. The ordering relationship can be represented in a variety of ways. For example, a graph can be used, with nodes representing integer expressions and edges representing the type of ordering relationship (e.g., greater than).

EXAMPLE 12

Exemplary Sources for Ordering Relationships

In any of the examples described, ordering relationships can include those relating to common unsound ordering assumptions by a programmer. Such assumptions are not always sound because they assume certain untrue premises (e.g., that an integer will not ever overflow or underflow).

For example, the following table lists several common unsound assumptions for integers:

TABLE 1

Common Unsound Ordering Assumptions

| Ordering Assumption | Why unsound |
| --- | --- |
| $x + 1 > x$ | $(x + 1)$ may overflow to a value less than $x$ |
| $x - 1 < x$ | $(x - 1)$ may underflow to a value greater than $x$ |
| $x + y > x$ | $(x + y)$ may overflow to a value less than $x$ |
| $x + y > y$ | $(x + y)$ may overflow to a value less than $y$ |
| $x - y < x$ | $(x - y)$ may underflow to a value greater than $x$ |

Other unsound assumptions may be used. For example, assumptions concerning multiplication can also be unsound.

An integer expression can include any expression in program instructions that contains an integer or results in an integer. For example, expressions such as "x", "x+1" "x++", "--y", and the like can be integer expressions, if these variables are defined as one of the integer types.

In some cases, what appears to be a single expression can be processed as plural expressions. For example, "x+1" can be processed as two expressions: x and (x+1).

The ordering relationships to be represented during the analysis can be chosen responsive to having encountered (e.g., detected) certain integer expressions in program instructions. Examples are shown in Table 2. The relationships created are based on common unsound ordering assumptions, such as those shown in Table 1.

TABLE 2

Ordering Relationship Triggers

| Expression Encountered | Ordering Relationship(s) Created |
| --- | --- |
| $x - 1$ | $(x - 1) < x$ |
| $x + 1$ | $(x + 1) > x$ |
| $x + y$ | $(x + y) > x, (x + y) > y$ |
| $x - y$ | $(x - y) < x$ |

Expressions relating to other operators such as multiplication (e.g., "*") or assignment (e.g., "=") can also trigger creation of ordering relationships. Although the examples are shown for particular variables (e.g., x and y), in practice a wide variety of integer variables may be encountered.

EXAMPLE 13

Exemplary Validation

A software defect can be identified by identifying an ordering relationship (e.g., derived from an unsound assumption) that is not validated by the program instructions. In any of the examples, validation can be performed by the instructions explicitly, implicitly, or some combination thereof. One or more software defects can be found in software instructions. In some cases, no defects may be detected because there are, in fact, no defects in the instructions.

EXAMPLE 14

Exemplary Explicit Validation

Explicit validation can be performed by a bounds check on an integer expression within the program instructions. For example, if an ordering relationship indicates that $x+1>x$, it is possible that the programming instructions can explicitly validate the relationship via the following code:

if ($x+1>x$) {[other instructions]}

Other techniques can be used. For example, the opposite (e.g., NOT) of an expression can be tested for validation. In the above example, a test can be done for "(!(x+1>x))" or an equivalent expression, such as "(x+1<=x)".

The comparison can be done anywhere in the function (e.g., it can be flow-insensitive).

Other types of validation (e.g., switch/case statements) can also be considered "explicit." The following is an exemplary use (e.g., an explicit bounds check on x) of a switch case statement:

```
switch (x)
{
  case 1:
  ...
  case 2:
  ...
}
```

In the example, validations corresponding to (x==1) and (x==2) are performed.

EXAMPLE 15

Exemplary Implicit Validation

Implicit validation can be performed in a variety of ways. Implicit validation accounts for those cases in which validation is not explicitly performed, but the relationship is still validated.

In one technique, the number of bounds checks (e.g., comparisons) for a particular expression is tracked. Using the number, implicit validation can be supported.

Relationships between expressions as represented and the number of bounds can be used to achieve implicit validation. For example, consider a given expression E. A sub-expression (SubExpr) of E can refer to expressions that are immediately less than E (e.g., in a representation having ordering relationships as described in any of the examples), whereas a super-expression (SuperExpr) of E can refer to expressions that are immediately greater than E (e.g., in a representation having ordering relationships as described in any of the examples).

For example, the following table lists several common rules regarding implicit validation, which can be used with any of the examples herein:

TABLE 3

Common Rules Regarding Implicit Validation

| Condition | Result |
|---|---|
| All of the SubExprs have two bounds | The order between the SubExprs and the SuperExpr (of the SubExpr) has been validated, and the SuperExpr and any equal expressions acquires the same number of bounds that the SubExprs have |
| One of the order edges in the lesser set (e.g., a set of nodes having a "lesser than" relationship to a node) has been validated | All of the order edges in the lesser set are validated |
| An expression has two bounds | If there is only one SubExpr, then that SubExpr has two bounds; all equal expressions have two bounds |
| An equal edge is validated | The two expressions have the same unsigned and bound properties |
| All the edges to SuperExprs are validated | The expression has two bounds |
| Equal edge between two expressions, where each expression has two bounds | The relationship is validated |

If the condition is true for the representation, then the result is applied to the representation. For example, the number of bounds for an expression can be increased. The rules can be applied iteratively or recursively (e.g., until no further progress is made) to a representation of program instructions. Other rules may be performed as part of the implicit validation process.

EXAMPLE 16

Exemplary Checking Regarding Buffer Access with Signed Integer Leading to Typecast Error In any of the examples herein, the program instructions may involve a buffer access scenario via a signed integer expression. In such a case, the number of bounds checked for the expression can be examined and, if the number of bounds checked is less than two, a software defect can be indicated. The software defect is that when the signed integer is used in the buffer access scenario, it may be cast as an unsigned integer, thereby leading to an unexpected result (e.g., an error).

EXAMPLE 17

Exemplary Detailed Method for Identifying Defects in Program Instructions

Figure 4:
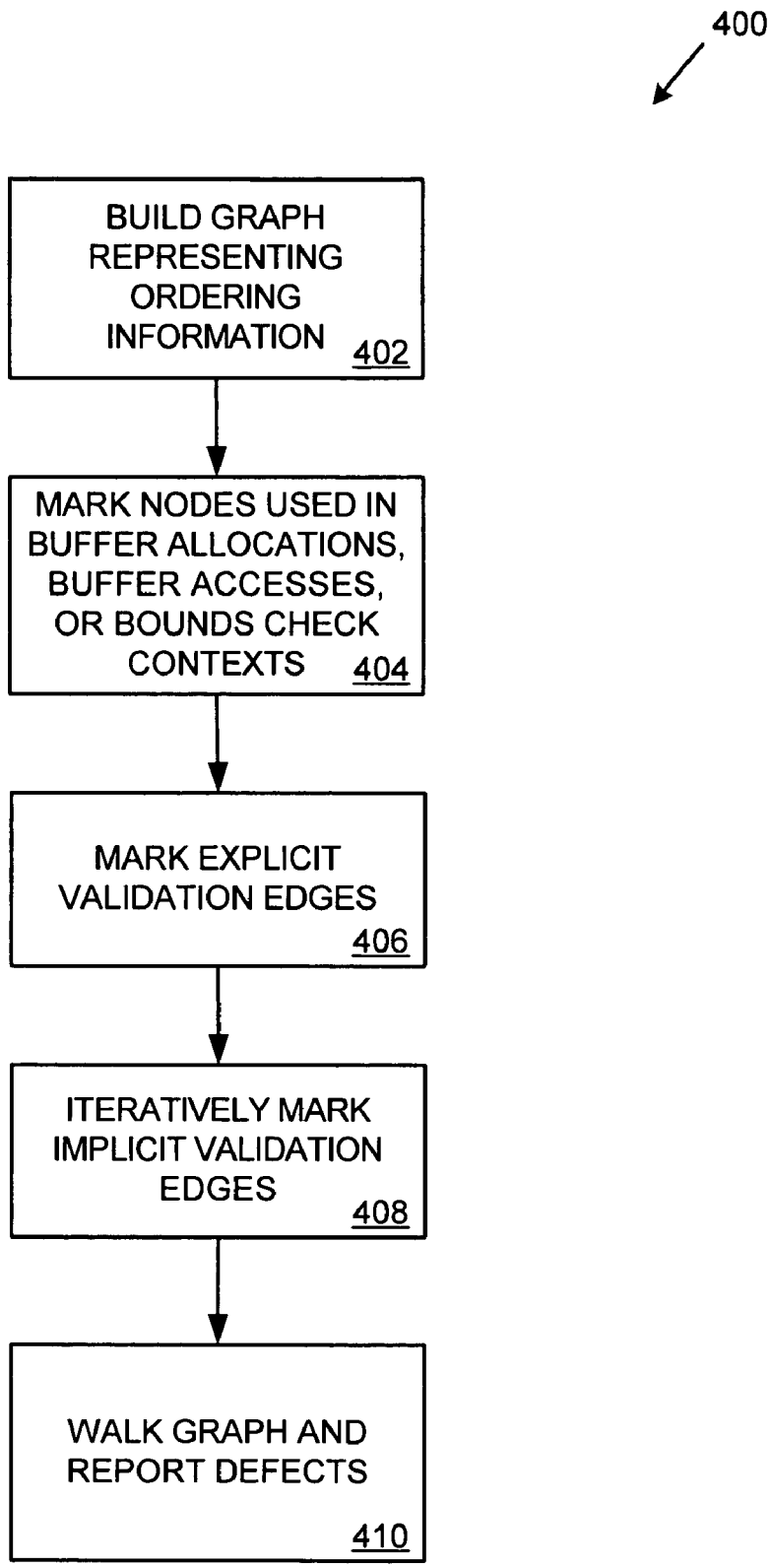
FIG. 4 is a flowchart illustrating a more detailed exemplary method for identifying defects in program instructions.

FIG. 4 is a flowchart illustrating a more detailed exemplary method 400 for identifying defects in input program instructions.

At 402, a graph representing ordering information between different integer expressions present in program instructions is built. In the graph, nodes can represent expressions in the program instructions and be created responsive to detecting integer expressions in the program instructions. Edges can represent the ordering information. For example, an edge between two nodes can represent that one node is assumed (e.g., possibly unsoundly) less than, equal to, or greater than the other node. Such ordering information can represent ordering relationships (e.g., such as those described above in Examples 11 and 12).

In any of the examples, each node can have a bounds property indicating how many bounds checks have already been performed on it. For example, the values can be zero, one, or two bounds. In any of the examples, each node can have a signed or unsigned property.

At 404, nodes (e.g., expressions) that are used in a buffer allocation (e.g., an allocation function call that takes an integer size argument), buffer access (e.g., an array access, pointer deref, buffer size argument, and the like), or bounds check context can be noted as such (e.g., marked). Other nodes can also be marked.

At 406, edges where the order between expressions has been explicitly validated (e.g., arithmetic comparison operations) can be noted as such (e.g., marked).

At 408, based on the results from 406, other edges in the graph where the order has been implicitly validated can be iteratively marked. The implicit validation techniques described in any of the examples can be used.

At 410, the graph can be walked and potential integer anomalies (e.g., overflows and underflows) on unvalidated paths between nodes marked at 404 can be reported. For example, it can be checked whether there is an unvalidated path from a node marked as significant (e.g., used in a buffer or range check) to any other expression. If so, a defect is indicated.

EXAMPLE 18

Exemplary Output

Figure 5:
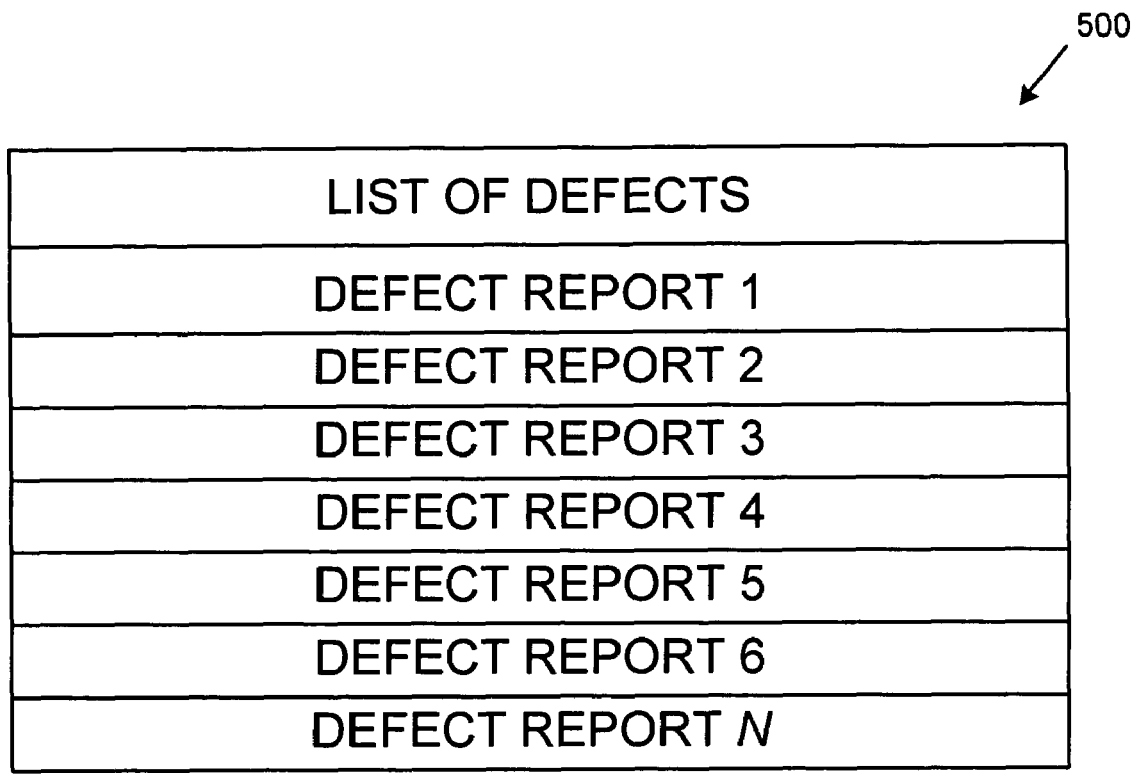
FIG. 5 is a block diagram illustrating an exemplary output list of defects identified in input program instructions.

FIG. 5 is a block diagram illustrating an exemplary output list 500 of defects identified in input program instructions. The output list 500 can comprise defect reports (e.g., compiler warnings) that can explain what expressions have potential integer anomalies (e.g., can overflow). The defect reports can also provide other types of information (e.g., relevant line numbers in the code and resulting buffer overruns).

EXAMPLE 19

A First Exemplary Implementation

Figure 6A:
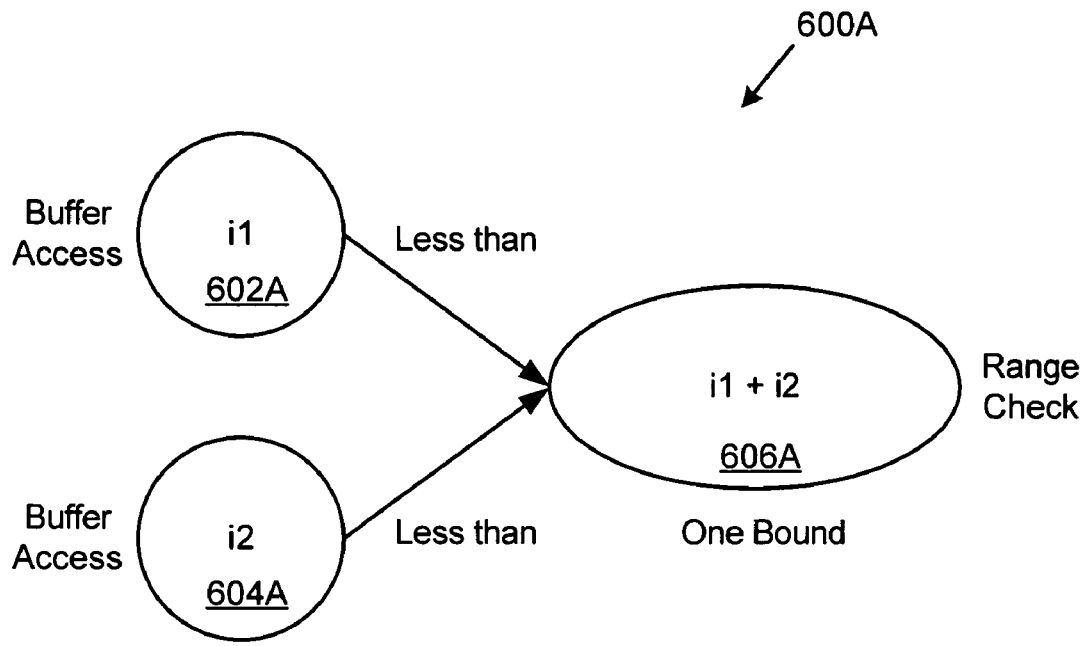
FIGS. 6A-B are block diagrams showing two graphs built and used in a first exemplary implementation of the disclosed technology.
Figure 6B:
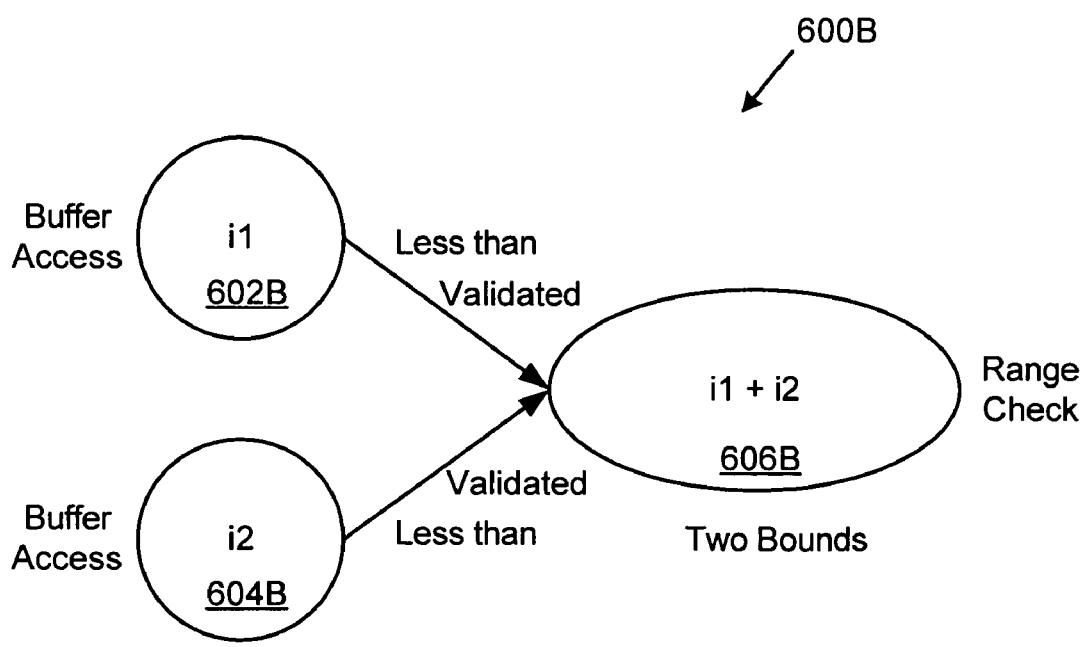

FIGS. 6A-B are block diagrams showing two graphs 600A-B built and used in a first exemplary implementation of the disclosed technology. In the example, the following code is provided as input program instructions:

```
void foo(char *s1, int i1, char *s2, int i2)
{
    char buf[100];
    if (i1 + i2 >= 100) return;
    memcpy(buf, s1, i1);
    memcpy(buf+i1, s2, i2);
}
```

The third line of the code above specifies that the local buffer can hold up to 100 characters. The next line defines a bounds check on the sum of variables i1 and i2. If the sum is less than the size of the buffer, then a possibly unsound assumption can be made that the operands, i1 and i2, will be less than the size of the buffer as well.

Such an assumption is incorrect, however, in the presence of integer overflows. For example, if i1 is 0xFFFFFFFF and i2 is 2, then the sum of i1 and i2 is 1 (which is less than 100), but i1 is greater than the size of the buffer. The next two lines copy each argument string (s1 and s2) into the local buffer, which can cause a buffer overrun. Thus, the program instructions contain a software defect in the form of a possible integer anomaly.

In the example, the first action of the implementation involves building a graph 600A in which a first node 602A is created for variable i1, a second node 604A is created for variable i2, and a third node 606A is created for the expression i1+i2. The edge between the first node 602A and the third node 606A represents that the first node 602A is assumed to be less than the third node 606A. The edge between the second node 604A and the third node 606A represents that the second node 604A is assumed to be less than the third node 606A. Such assumptions can be triggered by encountering expressions (e.g., containing "+") in the program instructions (e.g., as shown in Table 2).

The next action in the example involves marking buffer accesses or allocations and range checks. The first node 602A and the second node 604A are marked as buffer accesses responsive to their use in buffer accesses (e.g., the memcpy statement in the code above). And, the third node 606A is marked as a range check responsive to encountering the range check "i1+i2>=100."

Edges where the order between expressions has been explicitly validated (e.g., arithmetic comparison operations) can now be marked. In the example, there are none.

In the example, the third node 606A is marked as having one bound responsive to encountering the range check "i1+i2>=100." Edges where the order between expressions has been implicitly validated can now be marked. In the example, there are none.

At this point in the example, the graph 600A is walked and potential integer anomalies are identified. It is determined whether there is a directed path starting at a significant node that contains an unvalidated edge. In the examples, nodes 602A, 604A, and 606A are considered significant because they are marked as related to a buffer access or a range check. There is no path from node 606A.

However, there is a directed path in the graph 600A from the significant node 602A to the node 606A that has an unvalidated edge, which reveals that an integer anomaly can occur (e.g., where i2 is greater than i1+i2). Similarly, there is a directed path in the graph 600A from the significant node 604A to the node 606A, which reveals that another integer anomaly that can occur (e.g., where i2 is greater than i1+i2). These defects can now be reported to a user (e.g., a software developer).

Once the user has been alerted to these potential integer anomalies, the user can take steps to correct the source code to prevent such defects from occurring. In the example, the user modifies the source code shown above to that shown below:

```
void foo(char *s1, int i1, char *s2, int i2)
{
    char buf[100];
    if (i1 + i2 >= 100 || i1 + i2 < i1) return;
    memcpy(buf, s1, i1);
    memcpy(buf+i1, s2, i2);
}
```

The modified source code can be verified by subjecting it to the same analysis technique previously applied to the original source code above.

First, a graph 600B is built in which a first node 602B is created for variable i1, a second node 604B is created for variable i2, and a third node 606B is created for the expression i1+i2. The edge between the first node 602B and the third node 606B represents that the first node 602B is assumed to be less than the third node 606B. The edge between the second node 604B and the third node 606B represents that the second node 604B is assumed to be less than the third node 606B.

Next, the first node 602B and the second node 604B are marked as buffer accesses, and the third node 606B is marked as a range check. Edges where the order between expressions has been explicitly validated can now be marked. The edge between the first node 602B and the third node 606B is marked as explicitly validated responsive to the presence of the comparison i1+i2<i1 in the code.

Next, implicit validation can occur. The edge between the second node 604B and the third node 606B is marked as implicitly validated responsive to evaluation of the second rule in Table 3 (e.g., where one of the order edges (the edge between the first node 602B and the third node 606B) in a lesser set (e.g., the two edges shown are in a lesser set) has been validated, all of the order edges in the lesser set are validated).

Also, the third node 606B is marked as having two bounds responsive to detecting the two comparisons "i1+i2>=100" and "i1+i2<i1."

At this point, the graph 600B is walked and potential integer anomalies are identified. Traversing the graph 600B from the first node 602B to the third node 606B and from the second node 604B to the third node 606B reveals no defects because every path from in the graph 600B from a significant node has been validated.

EXAMPLE 20

A Second Exemplary Implementation

Figure 7A:
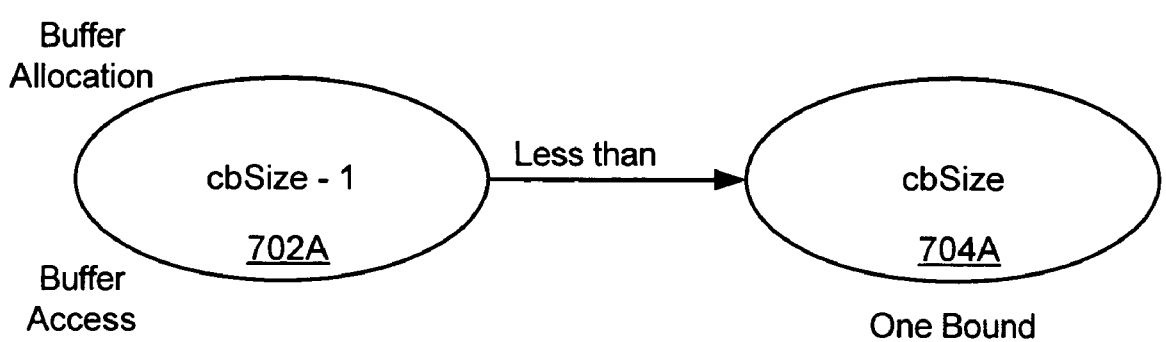
FIGS. 7A-B are block diagrams showing two graphs built and used in a second exemplary implementation of the disclosed technology.
Figure 7B:
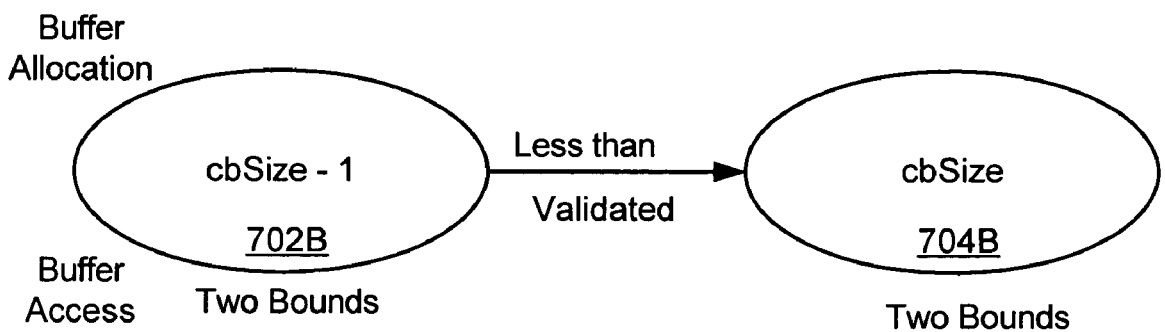

FIGS. 7A-B are block diagrams showing two graphs 700A-B built and used in a second exemplary implementation of the disclosed technology. In the example, the following code is provided as input:

```
void func(size_t cbSize)
{
    if (cbSize < 1024)
    {
        char *buf = new char[cbSize – 1];
        memset(buf, 0, cbSize – 1);
        delete [ ] buf;
    }
}
```

The third line of the code above checks that cbSize is less than 1024 but does not check that cbSize is greater than zero. If cbSize is equal to zero, then subtracting one can result in an integer underflow. Thus, the code has a defect in the form of a potential integer anomaly.

In the example, the first action involves building a graph 700A in which a first node 702A is created for the expression cbSize–1 and a second node 704A is created for cbSize. The edge between the nodes represents that the first node 702A is assumed to be less than the second node 704A and is created responsive to detecting the "–" operator.

Next, the first node 702A is marked as both a buffer allocation, responsive to its use in a buffer allocation and a buffer access, responsive to the memset statement in the sixth line of the code above. The second node 704A is marked as having one bound, responsive to encountering the comparison cbSize<1024.

Explicit validation edges can now be marked, but there are none. There are no implicit validations to be marked, either.

The graph 700A can now be walked so that defects can be identified. Traversing the graph from the first node 702A to the second node 704A reveals that an integer anomaly could occur (e.g., in situations where cbSize is zero). This potential anomaly can be reported, such as in a list of defects, to a user.

The user, alerted to this defect, can now take steps to address this issue in the code. Specifically, the user can modify the code as follows:

```
void func(size_t cbSize)
{
  if (cbSize > 0 && cbSize < 1024)
  {
    char *buf = new char[cbSize – 1];
    memset(buf, 0, cbSize – 1);
    delete [ ] buf;
  }
}
```

This modified code can be verified by applying the same analysis technique that was applied to the original code.

First, a graph 700B is built in which a first node 702B is created for the expression cbSize−1 and a second node 704B is created for cbSize. The edge between the nodes represents that the first node 702B is less than the second node 704B.

Next, the first node 702B is marked as both a buffer allocation and a buffer access. The second node 704B is marked as having two bounds, responsive to encountering the two comparisons cbSize>0 and cbSize<1024.

Explicit validation edges can now be marked, but there are none. Implicit validations can now be marked. First, application of the third rule in Table 3 causes the first node 702B to be marked has having two bounds responsive to detecting that the second node 704B has two bounds and that there is only one subexpression (e.g., the first node 702B) of the second node 704B. Subsequent application of the first rule in Table 3 causes an implicit validation because every subexpression (e.g., the first node 702B) of the second node 704B has two bounds. Thus, the path between the first node 702B and the second node 704B is marked as validated.

At this point, the graph 700B is walked and potential integer anomalies are identified. Traversing the graph 700B from the first node 702B to the second node 704B reveals no defects because every path in the graph 700B has been validated.

EXAMPLE 21

A Exemplary Implementation Involving Multiplication

Figure 8A:
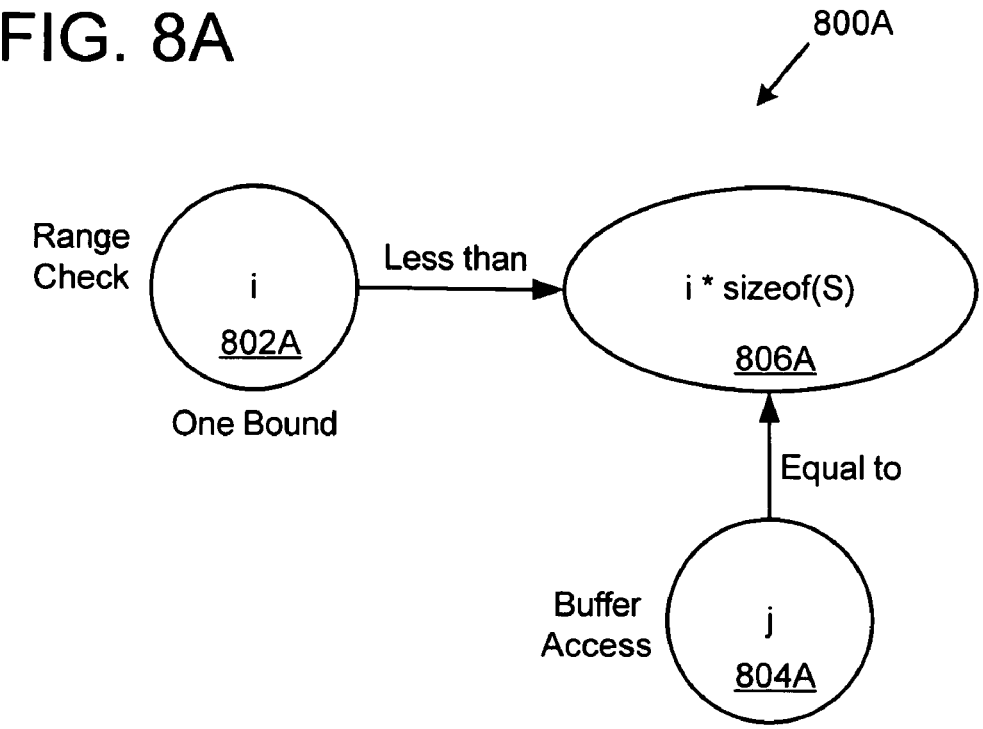
FIGS. 8A-B are block diagrams showing two graphs built and used in a exemplary implementation of the disclosed technology involving multiplication.
Figure 8B:
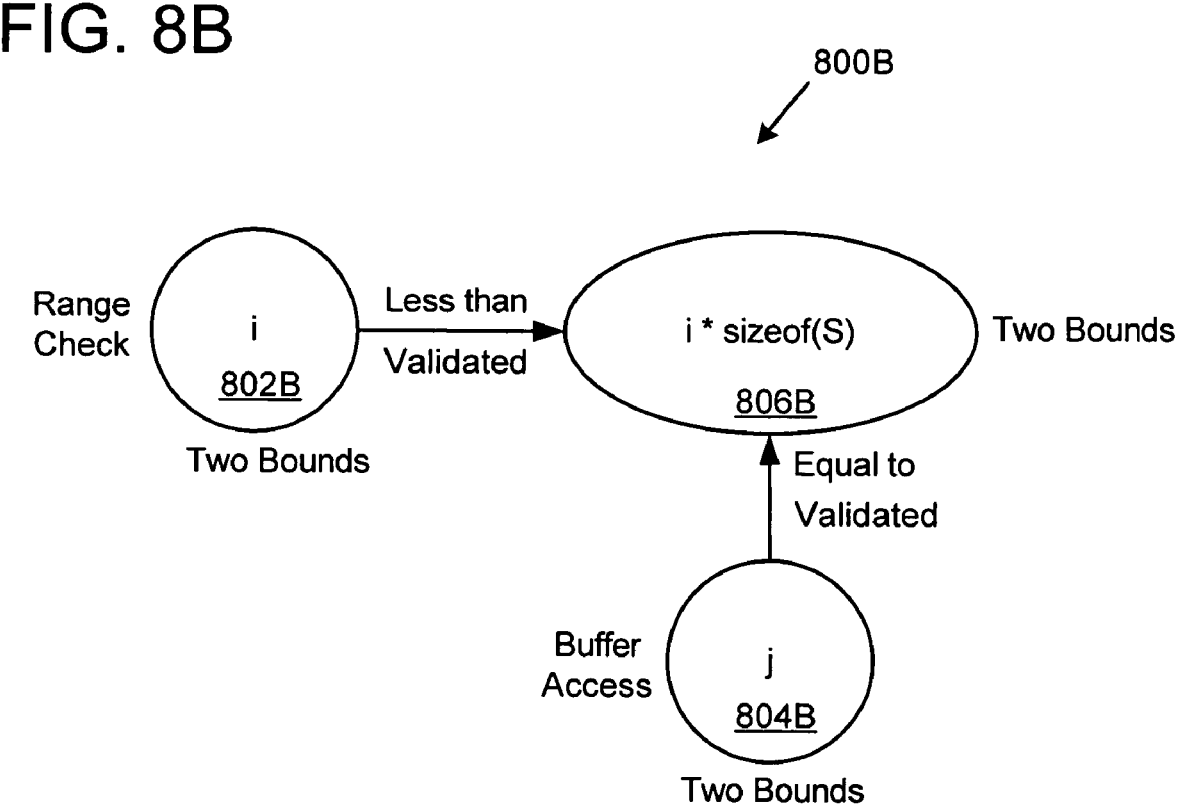

FIGS. 8A-B are block diagrams showing two graphs 800A-B built and used in an exemplary implementation of the disclosed technology involving multiplication. In the example, the following code is provided as input:

```
void CopyBuffer(struct S *pS, int i) {
  struct S arr[50];
  int j = i * sizeof(S); //sizeof(S) is a constant 20 here
  if(i < 50){
    memcpy(arr, pS, j);
  }
}
```

The third line of the code above checks that i is less than 50. A software developer might also assume j (calculated via i*sizeof(S)) must be in the range 0-950. Such an assumption, however, could result in an error during execution of the code. For example, if i is a negative number, then the value of j will be negative, so the use of j in the memcpy statement could lead to access outside the range of the buffer.

In the example, the first action of the implementation involves building a graph 800A in which a first node 802A is created for variable i, a second node 804A is created for variable j, and a third node 806A is created for the expression i * sizeof (S), where sizeof (S) is a constant 20 in the example. The edge between the first node 802A and the third node 806A represents that the first node 802A is assumed to be less than the third node 806A and is created responsive to encountering the "*" operator. The edge between the second node 804A and the third node 806A represents that the second node 804A is assumed to be equal to the third node 806A.

The next action in the example involves marking buffer accesses or allocations and range checks. The first node 802A is marked as a range check having one bound, responsive to the comparison i<50. The second node 804A is marked as a buffer access, responsive to the memcpy statement.

Edges where the order between expressions has been explicitly validated (e.g., arithmetic comparison operations) or implicitly validated can now be marked. In the example, there are none.

At this point in the example, the graph 800A is walked and potential integer anomalies are identified. Specifically, traversing the graph 800A from the second node 804A to the third node 806A reveals that a defect that can occur where j is equal to or less than i. The defect results because i has a negative value. Thus, the technique can identify when a programmer has made the incorrect assumption that multiplying a number will cause it to become larger (e.g., when, in fact, multiplying a negative number by a positive number causes it to become smaller). The technique can also thus identify when possible negative values have not been accounted for. This defect can now be reported to a user (e.g., a software developer).

Once the user has been alerted to this potential integer anomaly, the user can take steps to correct the source code to prevent such a defect from occurring. In the example, the user modifies the source code shown above to that shown below:

```
void CopyBuffer(struct S *pS, int i) {
  struct(S) arr[50];
  int j = i * sizeof(S); //sizeof(S) is a constant 20 here
  if(i < 50 && j > i){
    memcpy(arr, pS, j);
  }
}
```

The modified source code can be verified by subjecting it to the same analysis previously applied to the original source code above.

First, a graph 800B is built in which a first node 802B is created for variable i, a second node 804B is created for variable j, and a third node 806B is created for the expression i * sizeof (S). The edge between the first node 802B and the third node 806B represents that the first node 802B is assumed to be less than the third node 806B. The edge between the second node 804B and the third node 806B represents that the second node 804B is assumed to be equal to the third node 806B.

The first node 802B is marked as a range check having two bounds, responsive to the two comparisons i<50 && j>i, and the second node 804B is marked as a buffer access, responsive to the memcpy statement.

Edges where the order between expressions has been explicitly validated can now be marked. In the example, there are none.

Edges where the order between expressions has been implicitly validated can now be marked. The edge between the first node 802B and the third node 806B is marked as validated, responsive to application of the first rule in Table 3. Applying the first rule, the third node 806B acquires two bounds responsive to the determination that every SubExpr (e.g., the first node 802B) has two bounds, the order between the SubExpr and the SuperExpr is validated, and any equal expression (e.g., the second node 804B) acquires the same number of bounds that the SubExpr (e.g., the first node 802B) has. Since the SubExpr (e.g., the first node 802B) has two bounds, the second node 804B acquires two bounds because it is equal to the SuperExpr (e.g., the third node 806B). The edge between the second node 804B and the third node 806B is also marked as validated, responsive to application of the sixth rule in Table 3. Applying the rule, the edge is validated because each of the two expressions (e.g., the second node 804B and the third node 806B) on respective sides of the equal edge have two bounds.

At this point, the graph 800B is walked and potential integer anomalies are identified. Traversing the graph 800B from the first node 802B to the third node 806B and from the second node 804B to the third node 806B reveals no defects because every path in the graph 800B has been validated.

EXAMPLE 22

Figure 9A:
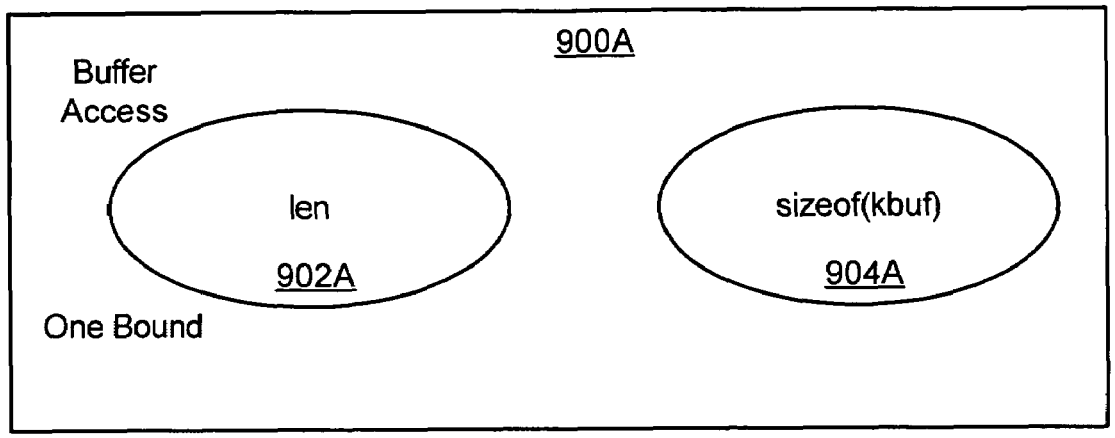
FIGS. 9A-B are block diagrams showing two graphs built and used in another exemplary implementation of the disclosed technology.
Figure 9B:
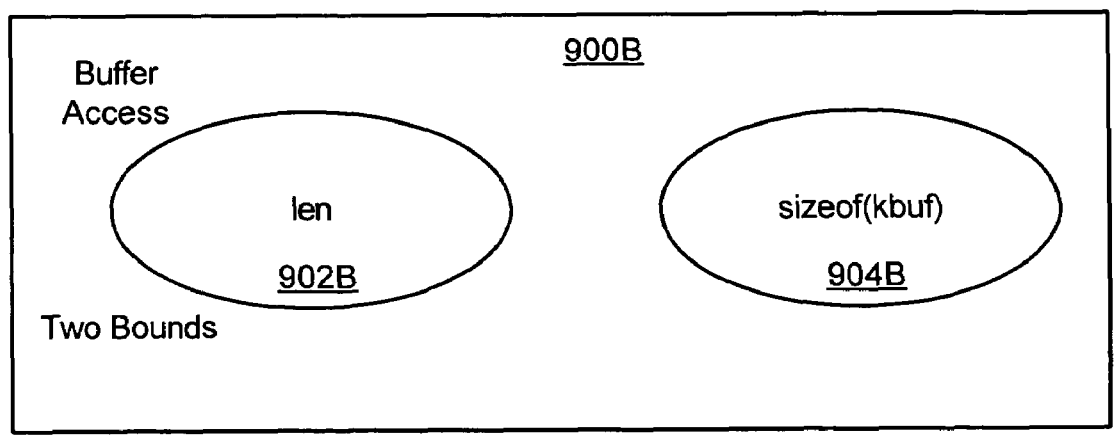

An Exemplary Implementation Involving Signed Integer Expressions in a Buffer Access Scenario FIGS. 9A-B are block diagrams showing two graphs 900A-B built and used to detect a defect indicated when a signed integer expression with only one bound is used in a buffer access scenario. Such a technique can be used alone or in conjunction with any of the examples described herein.

In the example, the following code is provided as input:

```
void copy_something(char *buf, int len)
{
    char kbuf[800];
    if(len > sizeof(kbuf)) return;
    memcpy(kbuf, buf, len);
}
```

The fourth line of the code above checks that len is greater than the size of the buffer kbuf but does not check that len is less than zero. If len is less zero, then an error could occur because it will be typecast to an unsigned integer when used in the buffer access.

In the example, the first action involves building a graph 900A in which a first node 902A is created for the expression len and a second node 904A is created for sizeof(kbuf).

Next, the first node 902A is marked as a buffer access, responsive to encountering the statement memcpy(kbuf, buf, len). The first node 902A is also marked as having one bound, responsive to encountering the comparison (len>sizeof (kbuf)).

The graph 900A can now be analyzed so that potential defects can be identified. Analyzing the graph reveals that a defect that could occur in situations where len is less than zero because this situation involves a signed integer expression with only one bound used in a buffer access (e.g., the memcpy statement). This potential defect can be reported, such as in a list of defects, to a user.

The user, alerted to this potential defect, can now take steps to address this issue in the code. Specifically, the user can amend the code as follows:

```
void copy_something(char *buf, int len)
{
    char kbuf[800];
    if(len < 0 || len > sizeof(kbuf)) return;
    memcpy(kbuf, buf, len);
}
```

This modified code can be verified by applying the same analysis to it that was applied to the original code.

First, a graph 900B is built in which a first node 902B is created for the expression len and a second node 904B is created for sizeof (kbuf).

Next, the first node 902B is marked as a buffer access, responsive to the statement memcpy statement. The first node 902B is also marked as having two bounds, responsive to the two comparisons in the statement len<0||len>sizeof (kbuf).

At this point, the graph 900B is checked and potential integer anomalies are identified. Analyzing the graph 900B reveals no defects because the signed integer expression now has two bounds.

EXAMPLE 23

Exemplary Data Structure for Detecting Software Defects

In any of the examples herein, the data structure used to represent ordering relationships between expressions can be implemented as a graph. In practice, a graph representation can be achieved by virtue of logical location of expressions. For example, the data structure can be interpreted in a horizontal and vertical sense. Thus, expressions having a "less than" relationship can be represented by expressions appearing to the left, and those having a "greater than" relationship can be represented by expressions appearing to the right.

Similarly, expressions having an "equal to" relationship can be stacked on top of or below each other vertically. Then, when the data structure is walked to find possible unvalidated paths, any unvalidated path from "left" to "right" can indicate a defect. Also, any unvalidated path "up" or "down" which leads to a node from "left" to "right" can also indicate a defect. Any other data structure suitable for representing a graph can be used.

EXAMPLE 24

Implementation as Part of Development Environment

The technology of any of the examples can be integrated into a software development environment. For example, the technology can be implemented as part of the MICROSOFT VISUAL STUDIO development environment. A user interface feature (e.g., an icon or menu item) can activate processing, and potential software defects can be identified to the user, who can be immediately taken to the defect in an editor, where it can be corrected.

EXAMPLE 25

Exemplary Advantages: Flow Insensitivity

In any of the examples described herein, a flow insensitive approach can be used. Thus, detection of defects can proceed without regard to control flow transitions such as branches, loops, and exceptions. Although such an analysis may not be flawless due to ignoring flow control (e.g., it may yield false positives), its performance is significantly better than a flow sensitive approach. And, many defects can be detected nonetheless. Therefore, a flow insensitive approach is a useful approach.

EXAMPLE 26

Exemplary Advantages: Intraprocedural Approach

In any of the examples described herein, an intraprocedural approach can be used. Thus, a function or procedure in the programming instructions can be analyzed independently of other functions or procedures. Thus, detection of defects can proceed without regard to relationships between procedures and functions. Although such an analysis may not be flawless (e.g., it may yield false positives), its performance is significantly better than one that accounts for inter-procedural processing. And, many defects can be detected nonetheless. Therefore, an intraprocedural approach is a useful approach.

EXAMPLE 27

Exemplary Advantages: Context Insensitive Approach

In any of the examples described herein, a context insensitive approach can be used. Thus, detection of defects can proceed without regard to the calling context for a function or procedure. Although such an analysis may not be flawless due to ignoring context (e.g., it may yield false positives), its performance is significantly better than a context sensitive approach. And, many defects can be detected nonetheless. Therefore, a context insensitive approach is a useful approach.

EXAMPLE 28

Exemplary Computing Environment

Figure 10:
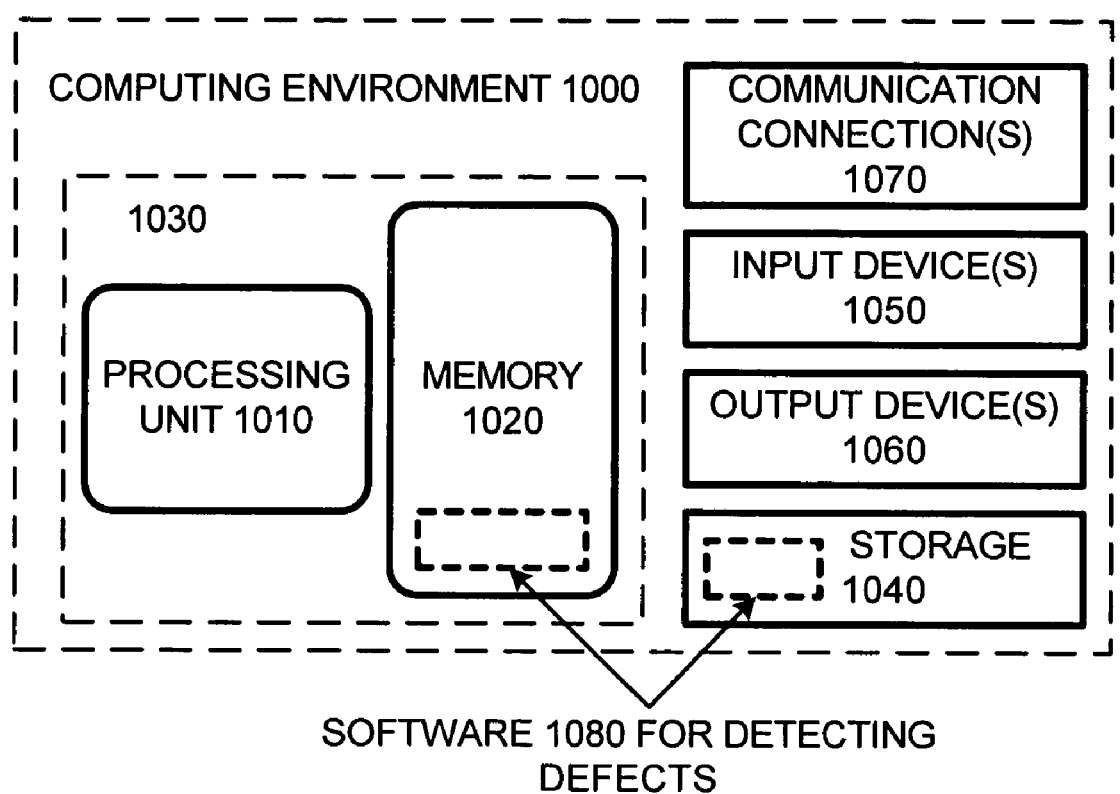
FIG. 10 is a block diagram of an exemplary suitable computing environment for implementing described implementations.

FIG. 10 illustrates a generalized example of a suitable computing environment 1000 in which the described techniques can be implemented. The computing environment 1000 is not intended to suggest any limitation as to scope of use or functionality of the invention, as the present invention may be implemented in diverse general-purpose or special-purpose computing environments.

With reference to FIG. 10, the computing environment 1000 includes at least one processing unit 1010 and memory 1020. In FIG. 10, this most basic configuration 1030 is included within a dashed line. The processing unit 1010 executes computer-executable instructions and may be a real or a virtual processor. In a multi-processing system, multiple processing units execute computer-executable instructions to increase processing power. The memory 1020 may be volatile memory (e.g., registers, cache, RAM), non-volatile memory (e.g., ROM, EEPROM, flash memory, etc.), or some combination of the two. The memory 1020 stores software 1080 implementing a defective code detection tool (e.g., defect detection tool 130 of FIG. 1).

A computing environment may have additional features. For example, the computing environment 1000 includes storage 1040, one or more input devices 1050, one or more output devices 1060, and one or more communication connections 1070. An interconnection mechanism (not shown) such as a bus, controller, or network interconnects the components of the computing environment 1000. Typically, operating system software (not shown) provides an operating environment for other software executing in the computing environment 1000, and coordinates activities of the components of the computing environment 1000.

The storage 1040 may be removable or non-removable, and includes magnetic disks, magnetic tapes or cassettes, CD-ROMs, CD-RWs, DVDs, or any other computer-readable media which can be used to store information and which can be accessed within the computing environment 1000. The storage 1040 stores software 1080 containing instructions for a defective code detection tool (e.g., defect detection tool 130 of FIG. 1).

The input device(s) 1050 may be a touch input device such as a keyboard, mouse, pen, or trackball, a voice input device, a scanning device, or another device that provides input to the computing environment 1000. For audio, the input device(s) 1050 may be a sound card or similar device that accepts audio input in analog or digital form, or a CD-ROM reader that provides audio samples to the computing environment. The output device(s) 1060 may be a display, printer, speaker, CD-writer, or another device that provides output from the computing environment 1000.

The communication connection(s) 1070 enable communication over a communication medium to another computing entity. The communication medium conveys information such as computer-executable instructions, audio/video or other media information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Communication media can embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. Communication media include wired media such as a wired network or direct-wired connection, and wireless media such as acoustic, RF, infrared and other wireless media. Combinations of any of the above can also be included within the scope of computer readable media.

The techniques herein can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

ALTERNATIVES

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. We therefore claim as our invention all that comes within the scope and spirit of these claims.

We claim:

1. One or more computer-readable storage media having computer-executable instructions for performing a method comprising:
   for a set of one or more integer expressions in a plurality of program instructions, responsive to encountering the one or more integer expressions, creating representations of ordering relationships between respective of the one or more integer expressions, wherein the ordering relationships represent a programmer assumption that an integer will not overflow or underflow;
   determining which of the ordering relationships are explicitly validated by one or more of the program instructions, the one or more of the program instructions, when executed, performing a bounds check to determine whether one of the one or more ordering relationships are satisfied; and
   identifying one or more ordering relationships that are not explicitly validated by the program instructions as unvalidated ordering relationships, wherein the unvalidated ordering relationships are indicative of at least one defect in the program instructions;
   wherein the creating representations of ordering relationships comprises creating a graph having directed edges, the graph comprising a first node representing a first one of the one or more integer expressions, a second node representing a second one of the one or more integer expressions, the first and second nodes connected by a directed edge representing at least one of the ordering relationships, the at least one of the ordering relationships relating the integer expressions represented by the first and second nodes and based at least on a greater than, a less than, a less than or equal to, a greater than or equal to, or an equal to relationship.

2. The one or more computer-readable storage media of claim 1 wherein the at least one defect comprises a possible integer overflow.

3. The one or more computer-readable storage media of claim 1 wherein the method further comprises:
   based on the unvalidated ordering relationships, providing a list of software defects in the program instructions, wherein the at least one defect is related to possible integer anomalies if the program instructions were to be executed.

4. The one or more computer-readable storage media of claim 1 wherein identifying one or more unvalidated ordering relationships comprises walking the graph to determine which ordering relationships are not validated.

5. The one or more computer-readable storage media of claim 1 wherein
   direction of the directed edges indicates a type of ordering relationship.

6. The one or more computer-readable storage media of claim 1 wherein the method further comprises:
   identifying, out of the one or more integer expressions, integer expressions of one or more particular use types; and
   limiting the identifying one or more unvalidated ordering relationships to integer expressions related to the one or more particular use types.

7. The one or more computer-readable storage media of claim 1 wherein the method further comprises:
   identifying, out of the one or more integer expressions, integer expressions relating to buffer processing; and
   limiting the identifying one or more ordering relationships that are not validated to the integer expressions relating to buffer processing.

8. The one or more computer-readable storage media of claim 1, wherein the method further comprises:
   indicating a defect responsive to detecting that a signed integer expression with only one bound is used in a buffer access scenario.

9. One or more computer-readable storage media having computer-executable instructions for implementing a software defect detection tool comprising:
   a store operable to store a representation of program instructions, wherein the representation identifies ordering relationships between integer expressions of the program instructions created responsive to detecting the integer expressions in the program instructions, the ordering relationships representing a programmer assumption that an integer will not overflow or underflow, the representation comprising a graph having directed edges, a first node representing a first one of the integer expressions, a second node representing a second one of the integer expressions, the first and second nodes connected by a directed edge representing at least one of the ordering relationships, the at least one of the ordering relationships relating the integer expressions represented by the first and second nodes and based at least on a greater than, a less than, a less than or equal to, a greater than or equal to, or an equal to relationship; and
   a processing engine operable to evaluate the representation of program instructions to determine whether the program instructions include arithmetic comparison operations that validate the ordering relationships between integer expressions of the program instructions thereby identifying at least one software defect related to integer anomalies within the program instructions.

10. In one or more computer-readable storage media a software development environment incorporating the software defect detection tool of claim 9, wherein:
   the processing engine is further operable to create the graph representation of source code that includes the program instructions.

11. A computer-implemented method of identifying defects in program instructions, the method comprising:

responsive to encountering one or more operators in the program instructions, creating representations of ordering relationships between integer expressions associated with the one or more operator, wherein the ordering relationships represent a programmer assumption that an integer will not overflow or underflow determining which of the ordering relationships are explicitly validated by one or more of the program instructions, the one or more program instructions, when executed, performing a bounds check to determine whether one or more of the ordering relationships are satisfied;

identifying whether one or more of the integer expressions are related to buffer processing; and in a computer, responsive to the determining and the identifying, identifying a portion of the program instructions associated with the one or more operators as associated with a potential integer overflow or a potential integer underflow, wherein the identifying a portion of the program instructions omits consideration of execution flow within the program instructions;

wherein the creating representations of ordering relationships comprises creating a graph having directed edges, the graph comprising a first node representing a first one of the integer expressions, a second node representing a second one of the integer expressions, the first and second nodes connected by a directed edge representing at least one of the ordering relationships, the at least one of the ordering relationships relating the integer expressions represented by the first and second nodes and based at least on a greater than, a less than, a less than or equal to, a greater than or equal to, or an equal to relationship.

12. One or more computer-readable storage media having computer-executable instructions for performing a method of identifying defects in program instructions, the method comprising:

responsive to encountering one or more operators in the program instructions, creating representations of ordering relationships between integer expressions associated with the one or more operators, wherein the ordering relationships represent a programmer assumption that an integer will not overflow or underflow determining which of the ordering relationships are explicitly validated by one or more of the program instructions, the one or more of the program instructions, when executed, performing a bounds check to determine whether one or more of the ordering relationships are satisfied;

identifying whether one or more of the integer expressions are related to buffer processing; and responsive to the determining and the identifying, identifying a portion of the program instructions associated with the one or more operators as associated with a potential integer overflow or a potential integer underflow, wherein the identifying a portion of the program instructions omits consideration of execution flow within the program instructions;

wherein the creating representations of ordering relationships comprises creating a graph having directed edges, the graph comprising a first node representing a first one of the integer expressions, a second node representing a second one of the integer expressions, the first and second nodes connected by a directed edge representing at least one of the ordering relationships, the at least one of the ordering relationships relating the integer expressions represented by the first and second nodes and based at least on a greater than, a less than, a less than or equal to, a greater than or equal to, or an equal to relationship, at least one of the first and second nodes representing an integer expression comprising at least two program variables referenced by the program instructions.

\* \* \* \* \*

UNITED STATES PATENT AND TRADEMARK OFFICE
CERTIFICATE OF CORRECTION

PATENT NO. : 7,624,304 B2
APPLICATION NO. : 10/961635
DATED : November 24, 2009
INVENTOR(S) : Thiagarajan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1306 days.

Signed and Sealed this

Twenty-sixth Day of October, 2010

David J. Kappos
*Director of the United States Patent and Trademark Office*